(12) United States Patent
Emambakhsh et al.

(10) Patent No.: US 9,623,828 B2
(45) Date of Patent: Apr. 18, 2017

(54) INFLATABLE CURTAIN AND METHOD FOR PLACING AN INFLATABLE CURTAIN IN A STORED CONDITION

(71) Applicant: TRW Vehicle Safety Systems Inc., Washington, MI (US)

(72) Inventors: Ali Emambakhsh, Yokohama (JP); Yin Liang, Gifu (JP); Eyad Nayef, Yokohama (JP)

(73) Assignee: TRW Vehicle Safety Systems Inc., Washington, MI (US)

( * ) Notice: Subject to any disclaimer, the term of this patent is extended or adjusted under 35 U.S.C. 154(b) by 0 days.

(21) Appl. No.: 14/774,793

(22) PCT Filed: Mar. 13, 2013

(86) PCT No.: PCT/IB2013/000881
§ 371 (c)(1),
(2) Date: Sep. 11, 2015

(87) PCT Pub. No.: WO2014/140665
PCT Pub. Date: Sep. 18, 2014

(65) Prior Publication Data
US 2016/0031403 A1    Feb. 4, 2016

(51) Int. Cl.
*B60R 21/232* (2011.01)
*B60R 21/237* (2006.01)
(Continued)

(52) U.S. Cl.
CPC .......... *B60R 21/232* (2013.01); *B60R 21/213* (2013.01); *B60R 21/237* (2013.01); *B60R 21/23138* (2013.01); *B62D 65/02* (2013.01)

(58) Field of Classification Search
CPC ............ B60R 21/213; B60R 21/23138; B60R 21/232
See application file for complete search history.

(56) References Cited

U.S. PATENT DOCUMENTS 6,361,068 B1    3/2002  Stein et al.
6,371,512 B1 *  4/2002  Asano ................... B60R 21/213
                                                280/728.2
(Continued)

OTHER PUBLICATIONS

Photos of curtain air bags on sale in 2010 and 2011.

*Primary Examiner* — Barry Gooden, Jr.
(74) *Attorney, Agent, or Firm* — Tarolli, Sundheim, Covell & Tummino LLP (57) ABSTRACT

An apparatus (10) helps to protect an occupant (28) of a vehicle (12) that has a side structure (16) and a roof (18). The apparatus (10) includes an inflatable vehicle occupant protection device (14) that has a stored condition for being positioned along the vehicle roof (18). The protection device (14) is inflatable away from the vehicle roof (18) to a deployed condition positioned between the side structure (16) and a vehicle occupant (28). The protection device (14) includes an upper edge portion (30) for being connected to the vehicle along the vehicle roof (18). A lower edge portion (38) of the protection device (14) is folded over onto itself at least once in the stored condition. The protection device (14), when in the stored condition, has a rolled-up configuration such that the folded over lower edge portion (38) occupies a central space (116) bounded by the rolled-up portion (114) of the protection device.

11 Claims, 5 Drawing Sheets

(51) Int. Cl.
*B60R 21/213* (2011.01)
*B60R 21/231* (2011.01)
*B62D 65/02* (2006.01)

(56) References Cited

U.S. PATENT DOCUMENTS

| | | | |
|---|---|---|---|
| 2004/0100074 A1* | 5/2004 | Bakhsh | B60R 21/213 |
| | | | 280/730.1 |
| 2004/0130128 A1 | 7/2004 | Bakhsh et al. | |
| 2007/0205589 A1 | 9/2007 | Enriquez et al. | |
| 2008/0258442 A1* | 10/2008 | Quach | B60R 21/201 |
| | | | 280/730.2 |
| 2010/0007121 A1* | 1/2010 | Mendez | B60R 21/237 |
| | | | 280/730.2 |
| 2015/0115582 A1* | 4/2015 | Ikenohata | B60R 21/237 |
| | | | 280/730.2 |
| 2015/0336531 A1* | 11/2015 | Kawamura | B60R 21/237 |
| | | | 280/730.2 |
| 2015/0375710 A1* | 12/2015 | Sievers | B60R 21/237 |
| | | | 280/730.2 |
| 2016/0001732 A1* | 1/2016 | Asada | B60R 21/232 |
| | | | 280/729 |
| 2016/0075300 A1* | 3/2016 | Tietze | B60R 21/213 |
| | | | 280/728.2 |
| 2016/0114753 A1* | 4/2016 | Fischer | B60R 21/237 |
| | | | 280/730.2 |

* cited by examiner

INFLATABLE CURTAIN AND METHOD FOR PLACING AN INFLATABLE CURTAIN IN A STORED CONDITION

RELATED APPLICATION

This application corresponds to PCT/IB2013/000881, filed Mar. 13, 2013, the subject matter of which is incorporated herein by reference in its entirety.

TECHNICAL FIELD

The invention relates to an inflatable vehicle occupant protection device for helping to protect an occupant of a vehicle.

BACKGROUND OF THE INVENTION

It is known to inflate an inflatable vehicle occupant protection device to help protect a vehicle occupant upon the occurrence of an event for which occupant protection is desired, such as a vehicle collision or rollover. One particular type of inflatable vehicle occupant protection device is an inflatable curtain. Inflatable curtains are inflatable from a stored condition away from a vehicle roof to a deployed position between a side structure of the vehicle and a vehicle occupant.

SUMMARY OF THE INVENTION

The invention relates to an apparatus for helping to protect an occupant of a vehicle that has a side structure and a roof. The apparatus includes an inflatable vehicle occupant protection device that has a stored condition for being positioned along the vehicle roof. The protection device is inflatable away from the vehicle roof to a deployed condition positioned between the side structure and a vehicle occupant. The protection device includes an upper edge portion for being connected to the vehicle along the vehicle roof. A lower edge portion of the protection device is folded over onto itself at least once in the stored condition. The protection device, when in the stored condition, has a rolled-up configuration such that the folded over lower edge portion occupies a central space bounded by the rolled-up portion of the protection device.

The invention also relates to a method for helping to protect an occupant of a vehicle that has a side structure and a roof. The method comprises the step of providing an inflatable vehicle occupant protection device having an upper edge portion for being connected to the vehicle along the vehicle roof and an opposite lower edge portion. The method also includes the step of folding the lower edge portion over onto itself at least once. The method comprises the further step of rolling the protection device up such that the folded over lower edge portion occupies a central space surrounded by the rolled up portion.

BRIEF DESCRIPTION OF THE DRAWINGS

The foregoing and other features of the invention will become apparent to those skilled in the art to which the invention relates upon reading the following description with reference to the accompanying drawings, in which.

DESCRIPTION OF EMBODIMENTS

Figure 1:
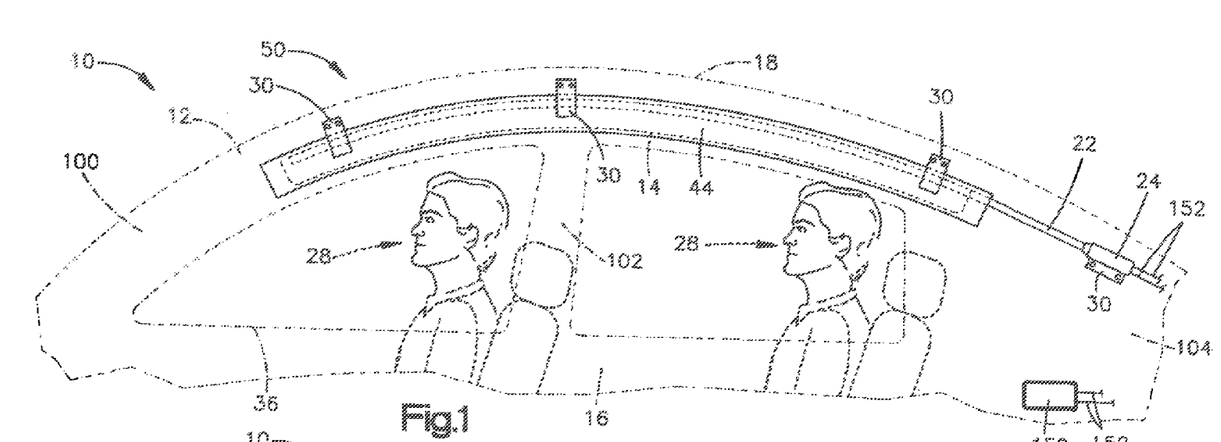
FIG. 1 is a schematic view illustrating a stored condition of an apparatus for helping to protect an occupant of a vehicle, according to the invention.
Figure 2:
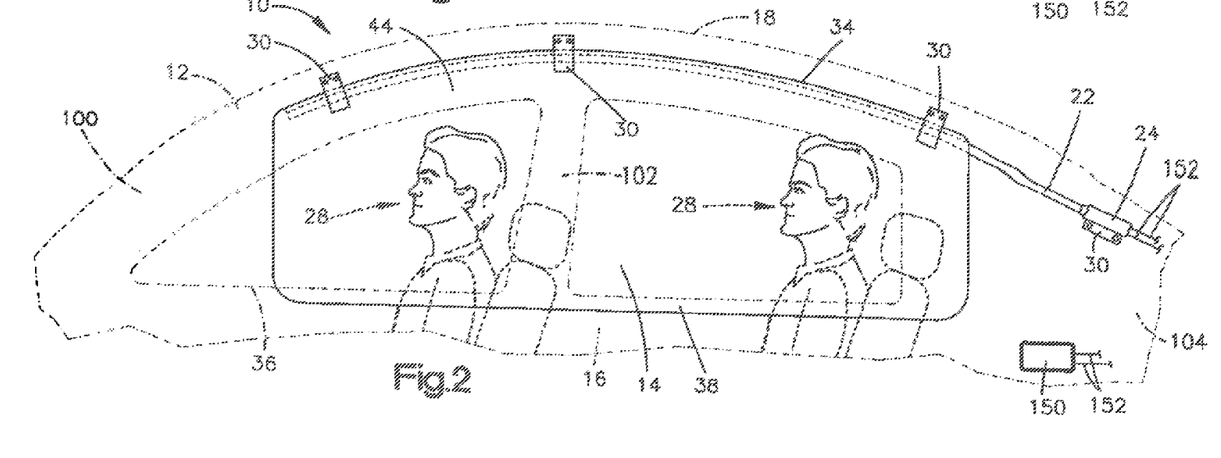
FIG. 2 is a schematic view illustrating a deployed condition of the apparatus of FIG. 1.

Representative of the invention, FIGS. 1 and 2 illustrate an apparatus 10 for helping to protect occupants 28 of a vehicle 12. The apparatus 10 includes an inflatable vehicle occupant protection device in the form of an inflatable curtain 14. The inflatable curtain 14 has a stored condition, shown in FIG. 1, in which the deflated curtain is rolled, folded, or rolled and folded, and positioned adjacent the intersection of a side structure 16 and a roof 18 of the vehicle 12. The inflatable curtain 14 is inflatable from the stored position in a direction away from the roof 18 to a deployed position shown in FIG. 2. In the deployed position, the inflated curtain 14 extends along the side structure 16 and is positioned between the side structure and any occupants 28 of the vehicle 12.

The inflatable curtain 14 can be formed from any suitable material. For example, the inflatable curtain 14 may be formed from a fabric woven with nylon yarns (e.g., nylon 6-6 yarns). Also, the inflatable curtain 14 may have any suitable construction. For example, the inflatable curtain 14 may have a one piece woven (OPW) construction in which the curtain is woven as a single piece of material. As another example, the inflatable curtain 14 may be constructed by interconnecting fabric panels via means, such as stitching, ultrasonic welding, heat bonding, or adhesives.

The inflatable curtain 14 may be uncoated, coated with a material, such as a gas impermeable urethane, or laminated with a material, such as a gas impermeable film. The inflatable curtain 14 thus may have a gas-tight or substantially gas-tight construction. Those skilled in the art will appreciate that alternative materials, such as polyester yarn, and alternatives coatings, such as silicone, may also be used to construct the inflatable curtain 14.

The apparatus 10 also includes an inflation fluid source in the form of an inflator 24. The inflator 24 is actuatable to provide inflation fluid for inflating the inflatable curtain 14. The inflator 24 may be of any suitable construction or configuration. For example, the inflator 24 may contain a stored quantity of pressurized inflation fluid (not shown) in the form of a gas for inflating the inflatable curtain 14. As another example, the inflator 24 could contain a combination of pressurized inflation fluid and ignitable material for heating the inflation fluid, or could be a pyrotechnic inflator that uses the combustion of gas-generating material to generate inflation fluid. As a further example, the inflator 24 could be of any suitable type or construction for supplying a medium for providing inflation fluid for inflating the inflatable curtain 14.

In the embodiment illustrated in FIG. 1, the inflator 24 is connected in fluid communication with the inflatable curtain 14 through a conduit or fill tube 22. The fill tube 22 may be constructed of any suitable material, such as metal, plastic, or fabric. Alternatively, the fill tube 22 may be omitted and inflation fluid could be discharged into the inflatable curtain 14 from the inflator 24 directly or through a manifold.

The fill tube 22 may also have any suitable configuration. For example, the fill tube 22 may extend substantially along the entire length of the inflatable curtain 14, as shown in FIGS. 1 and 2. Alternatively, the fill tube 22 may extend along any portion of the length of the inflatable curtain 14. The portion of the fill tube 22 positioned in the inflatable curtain 14 includes a plurality of openings (not shown) through which inflation fluid is delivered to the curtain.

The apparatus 10 also includes a cover 44 that helps support the inflatable curtain 14 in the stored condition. The cover 44 may have various constructions. For example, the cover 44 may have what is referred to as a "soft pack" construction. In a soft pack construction, the cover 44 may comprise a sheet or panel of material, such as fabric, that is wrapped or otherwise placed around the inflatable curtain 14. In one particular soft pack construction, the cover 44 is configured as a sock, sheath, or tube into which the inflatable curtain 14 and fill tube 22 are placed.

The fabric material used to construct the cover 44 may be a woven material, such as nylon or polyester, a non-woven material, such as a plastic film, or any other suitable material. The cover 44 may be constructed by interconnecting portions of the fabric material using known means, such as an adhesive, stitching, ultrasonic welding, heat bonding, or weaving the cover with an OPW construction. In one particular soft pack construction, the cover 44 may be formed by interconnecting portions of the fabric material via ultrasonic welding. Such a construction is shown in FIGS. 3A and 3B.

Figure 3A:
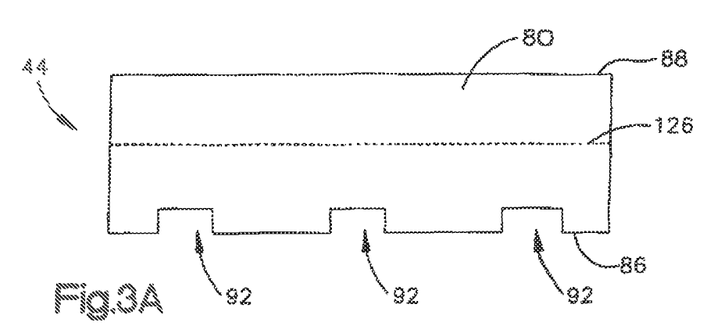
FIG. 3A is a plan view of a cover portion of the apparatus.
Figure 3B:
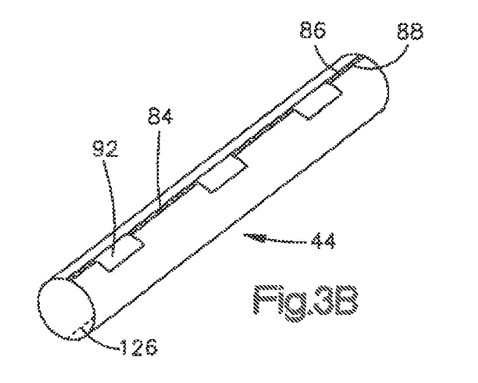
FIG. 3B is an isometric view of the cover of FIG. 3A in an assembled condition.

Referring to FIGS. 3A and 3B, the cover 44 may comprise a panel 80 of material that includes openings 92 cut or otherwise formed along a first edge portion 86 of the panel. The openings 92 may have any desired configuration, such as the generally rectangular notched configuration shown in FIGS. 3A and 3B. The openings 92 may intersect the lower edge 86 of the panel 80 as shown in FIGS. 3A and 3B. Alternatively, the openings 92 may be spaced from the lower edge 86 of the panel 80. In an assembled condition of the cover 44, shown in FIG. 3B, the first edge portion 86 is interconnected with an opposite second edge portion 88 by an ultrasonic weld 84. This gives the cover 44 a generally tubular sock or sheath-like configuration.

The cover 44 also includes a longitudinal tear seam 126 that extends generally parallel to the first and second edge portions 86 and 88 of the cover 44. As shown in FIGS. 3A and 3B, the tear seam 126 may be positioned generally centrally between the first and second edge portions 86 and 88 (FIG. 3A) and opposite the ultrasonic weld 84 (FIG. 3B). The tear seam 126 may, for example, comprise perforations that weaken the tear strength of the panel 80 along the tear seam.

Figure 4A:
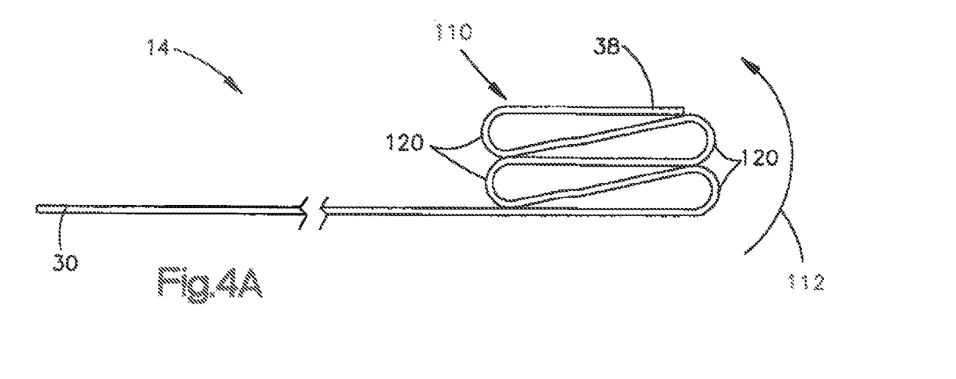
FIGS. 4A and 4B are schematic views illustrating a portion of the apparatus according to a first embodiment of the invention.

The apparatus 10 may be assembled for installation in the vehicle 12 as a unit. For example, the apparatus 10 may comprise an inflatable curtain module 50 (FIG. 4) that includes the inflator 24 connected to the fill tube 22, which is positioned in the rolled or folded inflatable curtain 14 and packaged in the cover 44. The inflatable curtain module 50 is supported in the vehicle 12 by means 30, such as hooks or brackets, that connect the inflatable curtain 14, inflator 24, fill tube 22, cover 44, or any combination thereof, to the vehicle 12. For example, the brackets 30 may encircle and clamp onto the fill tube 22 and portions of an upper edge portion 30 of the inflatable curtain 14 and extend through the openings 92 in the cover 44.

Upon sensing the occurrence of an event for which inflation of the inflatable curtain 14 is desired, a sensor 150 provides an actuation signal to the inflator 24 via lead wires 152. Upon actuation of the inflator 24, inflation fluid is directed through the fill tube 22 into the inflatable curtain 14. The inflating curtain 14 ruptures the cover 44 along the tear seam 126. The inflatable curtain 14 inflates and deploys under the pressure of inflation fluid provided by the inflator 24 from the stored position of FIG. 1 to the deployed position of FIG. 2.

In the deployed position, the inflatable curtain 14 is positioned between the side structure 16 and any occupants 28 of the vehicle 12. The inflatable curtain 14, when inflated, extends fore and aft in the vehicle 12 along the side structure 16 and may cover portions of an A pillar 100, B pillar 102 and a C pillar 104 of the vehicle. The upper edge portion 30 extends along the intersection of the side structure 16 and the vehicle roof 18, and a lower edge portion 38 extends along the side structure adjacent or near a vehicle belt line. The inflatable curtain 14 helps absorb impacts with the curtain and helps distribute the energy of impacts throughout a large area of the curtain.

In the tight confines of the vehicle structure along the side structure 16 and roof 18, space can be limited. As such, it can be highly desirable that the size of the inflatable curtain module 50 (referred to herein as "package size") be kept at a minimum. In this space, with space at such a premium, space savings even in the range of millimeters can be of great significance because the savings can be the determining factor on whether a particular curtain configuration can be used in a vehicle having a particular roof/side structure architecture.

One manner of placing the inflatable curtain 14 in the stored condition is using what is referred to as a roll-fold in which the curtain is rolled from the bottom up. When placing the inflatable curtain 14 in the stored condition in this manner, it is be desirable to maintain a tight roll, tight fold, or tight roll to help minimize the roll diameter of the curtain. Even so, when doing so, there are physical limitations placed by factors such as the material used to construct the inflatable curtain 14 and any applied coatings. For example, rolling the inflatable curtain 14 overly tight could cause blocking, in which overlying portions of the air bag stick to one another or otherwise resist or inhibit unrolling, which can inhibit quick and efficient curtain deployment. Additionally, the materials used to construct the material can inhibit the ability to roll the curtain to an ideally small diameter that reduces the package size of the inflatable curtain module 50. For example, the materials used to construct the inflatable curtain, the coatings applied to the curtain panels, and the materials used to interconnect the curtain panels can affect how tightly the curtain can be rolled, i.e., how small the diameter of the initial rolls of the curtain can be.

Figure 4B:
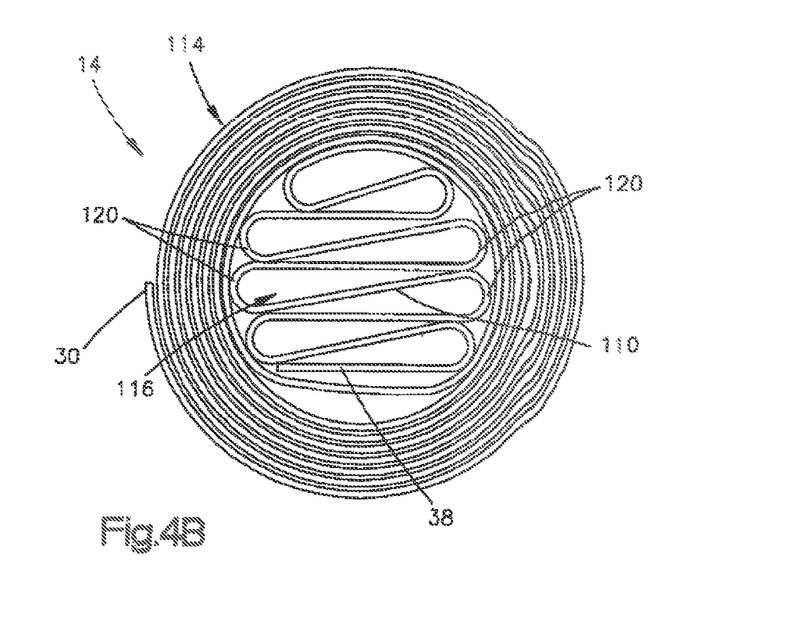

According to the invention, the inflatable curtain 14 employs a folding and rolling technique that is configured to take advantage of otherwise unused space in order to reduce the package size of the inflatable curtain module 50. Referring to FIGS. 4A-4C, according to one example embodiment, the inflatable curtain 14 employs a Z-folded and rolled configuration that utilizes space in the center of the roll to reduce the overall package size of the inflatable curtain module 50. By initially folding the lower edge portion 38 and then rolling the inflatable curtain 14, the lower edge portion can be at least partially positioned in the otherwise unoccupied central space of the roll By utilizing the otherwise unoccupied central space, the number of rolls in the curtain when in the stored condition can be reduced, which reduces the package size of the inflatable curtain module.

To achieve the reduced package size, the lower edge portion 38 of the inflatable curtain 14 is initially folded in a back-and-forth manner referred to herein as a Z-fold. The Z-fold 110 is illustrated in FIG. 4A. Once the Z-fold 110 is established, the inflatable curtain 14 is then rolled, beginning with the Z-fold 110 and the lower edge portion 38, in the direction indicated generally at arrow 112 in FIG. 4A. The rolling is continued until the inflatable curtain 14 achieves the completely rolled-up condition illustrated in FIG. 4B. The roll 114 illustrated in FIG. 4B leaves a central space 116 in which the Z-fold 110 portion of the curtain 14 is positioned. Since this space 116 would otherwise be left unoccupied, positioning the Z-fold 110 therein makes advantageous use of the central space. Using the central space 116 to store the Z-folded portion 110 of the inflatable curtain 14 thus helps to reduce the package size of the inflatable curtain module 50.

When placing the inflatable curtain 14 in the roll 114, care must be exercised to both maintain the folded condition of the Z-fold 110 and to maintain the position of the Z-fold in the central space 116. If such care is not exercised, the Z-fold 110 can become flattened and rolled up along with the roll 114. If this occurs, then the Z-fold 110 becomes part of the roll 114 instead of occupying the central space 116. The resulting roll 114 would not be reduced in size and may, in fact, be increased in size due to the Z-fold 110 being the initially rolled-up portion of the curtain 14.

In the embodiment illustrated in FIGS. 4A and 4B, the Z-fold 110 includes seven folds 120. The Z-fold 110 could, however include a greater number of folds or fewer folds. The number of folds included in the Z-fold 110 depends on interrelated factors such as the material used to construct the inflatable curtain 14, the types of coatings or laminates used on the curtains, reinforcements at the lower edge portion 38, and any stitching/adhesives used to interconnect the overlying curtain panels along the lower edge portion. Ideally, portions of the curtain 14 that limit the ability to roll the lower edge portion 38, can be included in the Z-fold 110 so as not to impact the diameter of the roll 114. For example, stitching and accompanying sealing of the stitching along the lower edge portion 38 may not be conducive to rolling the curtain 14. By including these portions in the Z-fold 110, however, these portions can be positioned in the central space 116. As a result, not only is the diameter of the roll 114 not increased by the stitching, it can in fact be decreased by placing that portion of the curtain 14 in the Z-fold 110 and positioned in the central space.

Figure 5A:
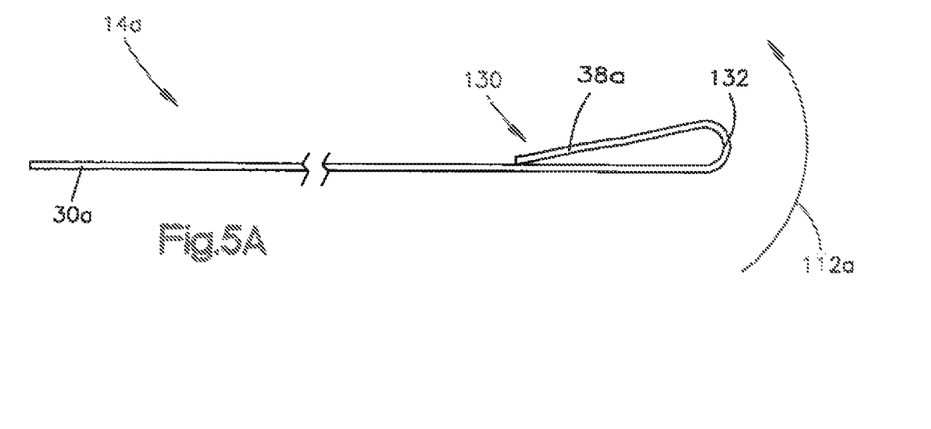
FIGS. 5A and 5B are schematic views illustrating a portion of the apparatus according to a second embodiment of the invention.
Figure 5B:
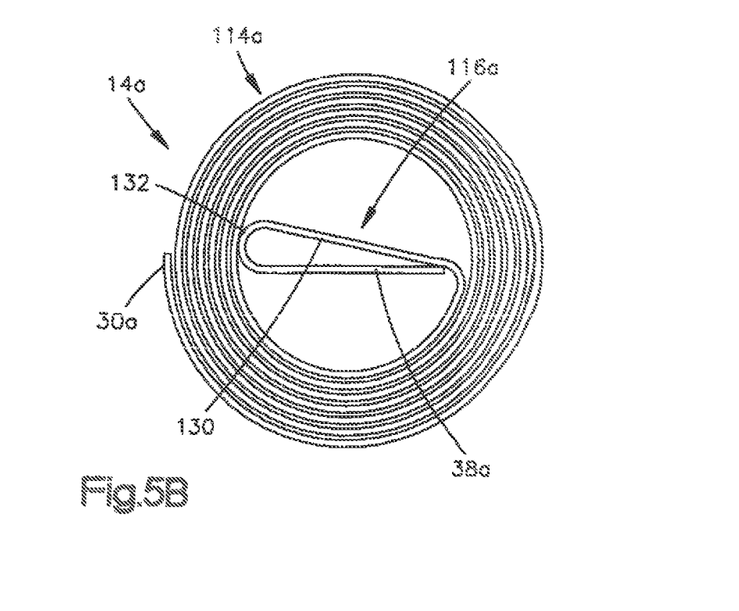

Another embodiment is illustrated in FIGS. 5A and 5B. In FIGS. 5A and 5B, reference numbers similar to those used in FIGS. 4A-4B will be utilized, the suffix letter "a" being associated with the numerals of FIGS. 5A and 5B to avoid confusion. The embodiment of FIGS. 5A and 5B is similar to the embodiment of FIGS. 4A-4B, except that the Z-fold 110 of FIGS. 4A and 4B is replaced with a flip-fold in FIGS. 5A-5B.

In the embodiment of FIGS. 5A and 5B, the lower edge portion 38a of the inflatable curtain 14a is initially folded over once in a manner referred to herein as a flip-fold. The flip-fold 130 is illustrated in FIG. 5A. Once the flip-fold 130 is established, the inflatable curtain 14a is then rolled, beginning with the flip-fold 130 and the lower edge portion 38a, in the direction indicated generally at arrow 112a in FIG. 5A. The rolling is continued until the inflatable curtain 14a achieves the completely rolled-up condition illustrated in FIG. 5B. The roll 114a illustrated in FIG. 5B leaves a central space 116a in which the flip-fold 130 portion of the curtain 14a is positioned. Since this space 116a would otherwise be left unoccupied, positioning the flip-fold 130 therein makes advantageous use of the central space. Using the central space 116a to store the flip-folded portion 130 of the inflatable curtain 14a thus helps to reduce the package size of the inflatable curtain module.

When placing the inflatable curtain 14a in the roll 114a, care must be exercised to both maintain the folded condition of the flip-fold 130 and to maintain the position of the flip-fold in the central space 116a. If such care is not exercised, the flip-fold 130 can become flattened and rolled up along with the roll 114a. If this occurs, then the flip-fold 130 becomes part of the roll 114a instead of occupying the central space 116a. The resulting roll 114a would not be reduced in size and may, in fact, be increased in size due to the flip-fold 130 being the initially rolled-up portion of the curtain 14a.

In the embodiment illustrated in FIGS. 5A and 5B, the flip-fold 130 includes a single fold 132. Nevertheless, this single fold 132 and the resulting flip fold 130 being positioned in the central space 116a can produce a significant reduction in package space. This is due at least in part to the fact that the flip-fold 130 is made in the lower edge portion 38a of the inflatable curtain 14a. The lower edge portion 38a can include stitching that interconnects the overlying panels of the curtain 14a, any sealing materials (e.g., coatings or gaskets) used to seal the stitching and/or edge of the curtain, and reinforcing materials, all of which can make it difficult to roll that particular portion of the curtain. As a result, rolling this lower portion 38a of the curtain 14a can require the initial rolls to have a larger than desired diameter which cascades throughout the rolling of the curtain, leading to a package size that is larger than desired. Placing the flip-fold 130 of the invention in the central space 116a at least partially removes the lower portion 38a of the curtain 14a from impacting the diameter of the roll 114a, thereby reducing the package size of the inflatable curtain module.

Figure 6:
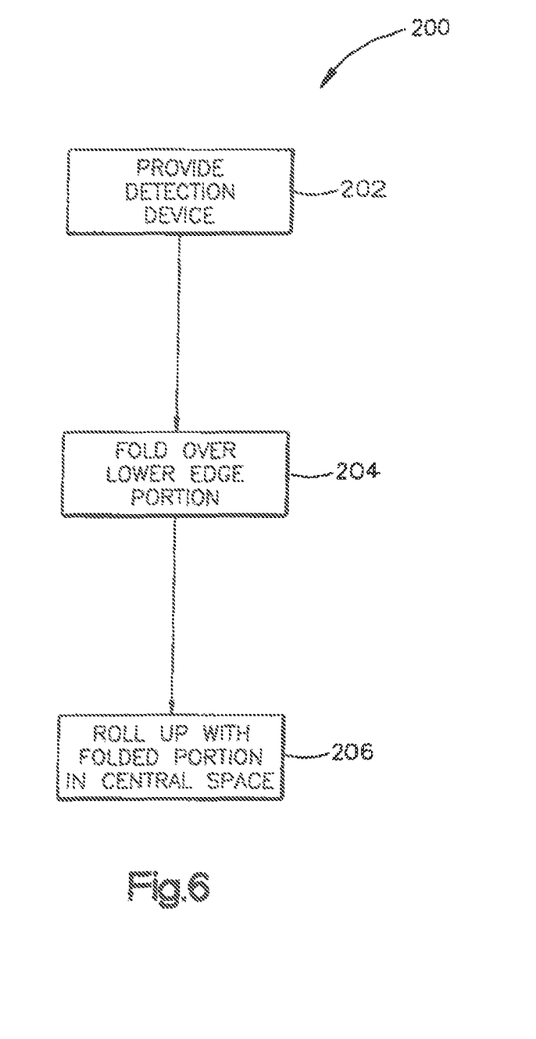
FIG. 6 is a block diagram illustrating a method according to the invention.

Referring to FIG. 6A, a method 200 for placing the inflatable curtain in a stored condition includes the step 202 providing an inflatable vehicle occupant protection device having an upper edge portion for being connected to the vehicle along the vehicle roof and an opposite lower edge portion. The method 200 also includes the step 204 of folding the lower edge portion over onto itself at least once. The method 200 further includes the step 206 of rolling the protection device up such that the folded over lower edge portion occupies a central space surrounded by the rolled up portion. The step 206 of rolling the protection device comprises the step of maintaining the folded over lower edge portion positioned in the central space so that it does not become rolled up with the remainder of the protection device.

The step 204 of folding the lower edge portion can include folding the lower edge portion in a z-fold configuration. The z-fold configuration can include at least two folds in opposite directions. Alternatively, the step 204 of folding the lower edge portion can include folding the lower edge portion in a single fold configuration. The single fold configuration can include a single folded portion that occupies multiple layers of the roll.

From the above description of the invention, those skilled in the art will perceive applications, improvements, changes and modifications to the invention. Such applications, improvements, changes and modifications within the skill of the art are intended to be covered by the appended claims.

Having described the invention, we claim the following:

1. A method for placing an inflatable vehicle occupant protection device in a stored condition, method comprising the steps of:
   providing an inflatable vehice occupant protection device having an upper edge portion for being connected to a vehicle along a vehicle roof and an opposite lower edge portion;
   folding the lower edge portion over onto itself at least once; and
   rolling the protection device up such that the folded over lower edge portion occupies a central space surrounded by the rolled up portion and such that the folded over lower edge portion maintains the folded condition and overlying folded over portions of the folded over lower edge are free from being rolled up with the surrounding rolled up portion of the protection device.

2. The method recited in claim 1, wherein the step of folding the lower edge portion comprises folding the lower edge portion in a z-fold configuration comprising at least two folds in opposite directions.

3. The method recited in claim 1, wherein the step of folding the lower edge portion comprises folding the lower edge portion in a single fold configuration such that the single folded portion occupies multiple layers of the rolled up portion.

4. The method recited in claim 1, wherein, during the step of rolling the protection device, the folded over lower edge portion is not distorted by the rolled up portion.

5. An air bag folded and rolled according to the method of claim 1.

6. The method recited in claim 1, wherein the step of rolling the protection device comprises preventing the folded over lower edge portion of the protection device from conforming to the curved configuration of the surrounding rolled up portion of the protection device.

7. An apparatus for helping to protect an occupant of a vehicle that has a side structure and a roof, the apparatus comprising:
   an inflatable vehicle occupant protection device having a stored condition for being positioned along the vehicle roof, the protection device being inflatable away from the vehicle roof to a deployed condition positioned between the side structure and a vehicle occupant, the protection device comprising:
   an upper edge portion for being connected to the vehicle along the vehicle roof and an opposite lower edge portion, the lower edge portion being folded over onto itself at least once in the stored condition of the protection device, the protection device when in the stored condition having a rolled-up configuration such that the folded over lower edge portion occupies a central space bounded by the rolled-up portion of the protection device, the folded over lower edge portion being configured in the central space to maintain a folded condition and overlying folded over portions of the folded over lower edge are free from being rolled up with the surrounding rolled up portion of the protection device.

8. The apparatus recited claim 7, wherein the folded over lower edge portion has a z-fold configuration comprising at least two folds in opposite directions.

9. The apparatus recited in claim 7, wherein the folded over lower edge portion has a single fold configuration, the roll being configured such that the single folded portion occupies multiple layers of the rolled-up portion.

10. The apparatus recited in claim 7, wherein the folded over lower edge portion is maintained in the central space such that the rolled-up portion does not distort the folded over lower edge porton.

11. The apparatus recited in claim 7 wherein the protection device is configured and arranged such that the folded over lower edge portion of the protection device does not conform to the curved configuration of the surrounding rolled up portion of the protection device.

* * * * *

UNITED STATES PATENT AND TRADEMARK OFFICE
CERTIFICATE OF CORRECTION

PATENT NO.        : 9,623,828 B2
APPLICATION NO.   : 14/774793
DATED             : April 18, 2017
INVENTOR(S)       : Ali Emambakhsh et al.

It is certified that error appears in the above-identified patent and that said Letters Patent is hereby corrected as shown below:

Column 7, Line 3 reads "method" should read --the method--

Column 7, Line 5 reads "vehice" should read --vehicle--

Column 8, Line 21 reads "claim 7" should read --in claim 7--

Column 8, Line 32 reads "porton" should read --portion--

Signed and Sealed this
Thirteenth Day of June, 2017

Joseph Matal
*Performing the Functions and Duties of the
Under Secretary of Commerce for Intellectual Property and
Director of the United States Patent and Trademark Office*